US006949924B2

United States Patent
Lewis

(10) Patent No.: US 6,949,924 B2
(45) Date of Patent: Sep. 27, 2005

(54) ELECTROMECHANICAL ROTATION SENSING DEVICE

(75) Inventor: Clifford William Lewis, Wayland, MA (US)

(73) Assignee: Adaptive Instruments LLC, Hudson, MA (US)

( * ) Notice: Subject to any disclaimer, the term of this patent is extended or adjusted under 35 U.S.C. 154(b) by 81 days.

(21) Appl. No.: 10/174,858

(22) Filed: Jun. 19, 2002

(65) Prior Publication Data

US 2003/0020466 A1 Jan. 30, 2003

Related U.S. Application Data

(60) Provisional application No. 60/307,922, filed on Jul. 26, 2001.

(51) Int. Cl.[7] .................................................. G01B 7/30
(52) U.S. Cl. .................................................. 324/207.21
(58) Field of Search ........................ 324/207.21, 207.25; 73/722, 728, 735, 754; 338/32 R

(56) References Cited

U.S. PATENT DOCUMENTS

| | | | | |
|---|---|---|---|---|
| 3,338,101 A | * | 8/1967 | Krasnitz et al. ............... 73/742 |
| 4,283,679 A | * | 8/1981 | Ito et al. ...................... 324/165 |
| 4,613,851 A | * | 9/1986 | Hines .......................... 340/688 |
| 4,682,171 A | * | 7/1987 | Nakamura ................... 340/975 |
| 4,745,811 A | * | 5/1988 | Gray ........................... 73/708 |
| 4,905,520 A | * | 3/1990 | Nehrlich et al. ............... 73/753 |
| 4,975,687 A | * | 12/1990 | Murphy et al. ............. 340/688 |
| 5,231,508 A | * | 7/1993 | Murphy, Jr. ............... 338/32 H |
| 5,351,003 A | * | 9/1994 | Bauer et al. ............. 324/207.12 |
| 6,265,867 B1 | * | 7/2001 | Fowler ................... 324/207.24 |
| 6,499,353 B1 | * | 12/2002 | Douglas et al. ............... 73/722 |

* cited by examiner

*Primary Examiner*—Bot Ledynh
*Assistant Examiner*—Reena Aurora
(74) *Attorney, Agent, or Firm*—Iandiorio & Teska

(57) ABSTRACT

An electromechanical rotation sensing device includes a mechanical sensing system for sensing a physical parameter; a rotational member rotated by the mechanical sensing system in response to the parameter sensed; a magnetic device movable with the rotational member and providing a magnetic field whose orientation changes with motion of the rotational member; and a magnetic field sensor providing an electrical signal responsive to the orientation of the magnetic field.

13 Claims, 2 Drawing Sheets

ELECTROMECHANICAL ROTATION SENSING DEVICE

RELATED APPLICATIONS

This invention claims priority of Provisional Patent Application Ser. No. 60/307,922 filed Jul. 26, 2001.

FIELD OF THE INVENTION

This invention relates to an electromechanical rotation sensing device and more particularly to such a device for converting rotational indicator motion to an electrical signal.

BACKGROUND OF THE INVENTION

Pressure sensors currently exist that sense pressure and convert the sensed pressure to a visual rotational movement. The current embodiment of these devices is most notably exemplified by a bourdon tube pressure gauge. In such devices, a curved tube (bourdon tube) tends to straighten as pressure is applied. This movement is converted and transferred, through a series of mechanical devices, to a rotational movement of a dial needle, thus giving a visual indication of the sensed pressure. Hundreds of thousands of these type devices are produced every year. Unfortunately, it is difficult to derive an electrical signal from these mechanical movement type devices. Electrical signals can be derived utilizing other technologies, most notably strain gauge type sensors. However, strain gauge sensors tend to be somewhat more expensive and provide no visual indication of the sensed pressure. Electrical signals are extremely valuable for providing information to machine-based data collection and processing systems. Most such machine-based systems are not equipped to readily handle visual signals, but are very capable of handling various analog or digital electrical signals.

BRIEF SUMMARY OF THE INVENTION

It is therefore an object of this invention to provide an improved electromechanical rotation sensing device.

It is a further object of this invention to provide such an improved electromechanical rotation sensing device which converts rotational motion representative of some sensed quantity into an electrical signal.

It is a further object of this invention to provide such an improved electromechanical rotation sensing device which can present a visual indication as well as an electrical signal representative of a sensed quantity.

It is a further object of this invention to provide such an improved electromechanical rotation sensing device which is simple, inexpensive and easily incorporated into conventional rotational dial meters.

This invention results from the realization that a truly simple, inexpensive, and yet effective electromechanical rotation sensing device for presenting a visual indication as well as an electrical signal representative of a sensed quantity can be achieved with a magnet movable with the visual indicator and a magnetic field sensor responsive to the orientation of the resulting magnetic field.

This invention features a electromechanical rotation sensing device including a mechanical sensing system for sensing a physical parameter and a rotational member rotated by the mechanical sensing system in response to the parameter sensed. A magnetic device is movable with the rotational member and provides a magnetic field whose orientation changes with motion of the rotational member and a magnetic field sensor provides an electrical signal responsive to the orientation of the magnetic field.

In the preferred embodiment, the rotational member may include a shaft and it may further include a dial indicator attached to the shaft and a graduated dial face. The magnetic device may include a magnet, the magnet may be a permanent magnet. The magnetic field sensor may include a magneto resistive sensor. The magnetic device may provide a magnetic field within a predetermined range and the magnetic field sensor may be sensitive to the orientation and independent of the intensity of the magnetic field within that predetermined range. The magnetic sensor may include a giant magneto resistive sensor. The mechanical sensing system may include a bourdon tube. The predetermined range may be 5–15 kA/m. The magnetic field sensor may include an amplifier and it may include an analog to digital converter.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
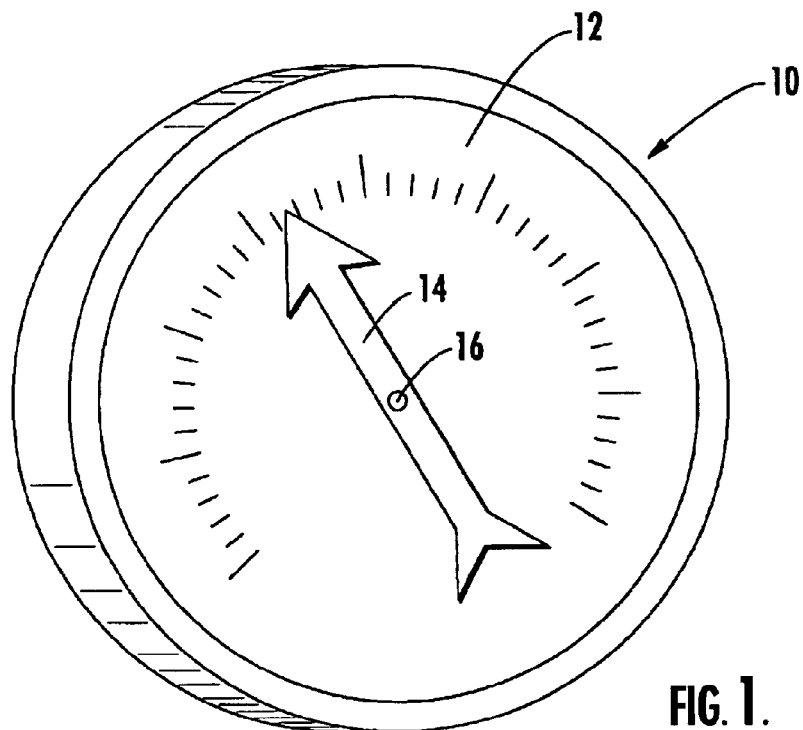
FIG. 1 is a simplified front plan view of a prior art dial face and dial indicator of a conventional pressure sensing meter.
Figure 2:
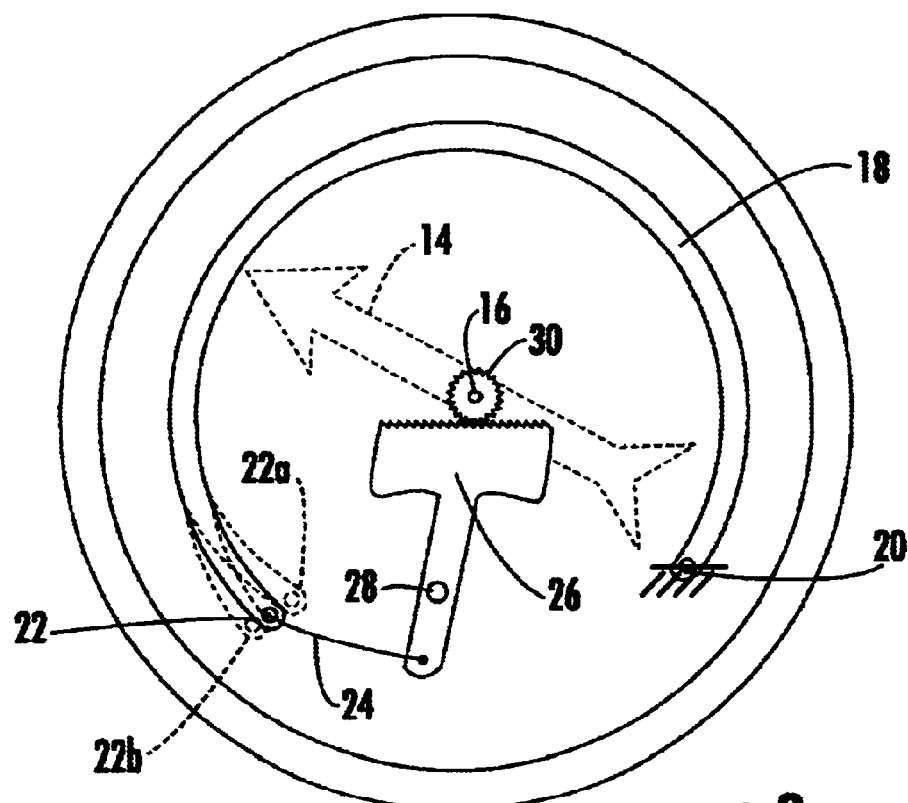
FIG. 2 is a view of the meter of FIG. 1 from the back showing the bourdon tube and mechanism which rotates the indicator dial of FIG. 1.

There is shown in FIG. 1 a conventional meter 10 such as a pressure meter including a dial face 12 and dial indicator 14 which rotates with shaft 16. Pressure may be sensed by a bourdon tube 18, FIG. 2, which is fixed at one end 20 and floats free at the other end 22 such that decreases and increases in pressure move the free end 22 and thereby, through link 24, drive rack 26 pivoted at 28 to rotate pinion 30 and with it shaft 16 and dial indicator 14.

While this has been a conventional means for providing visual readouts of pressure and, using other mechanisms, various other physical parameters, it is often necessary or desirable to have an electrical signal produced which represents the physical parameter measured in addition to having it displayed visually.

Figure 3:
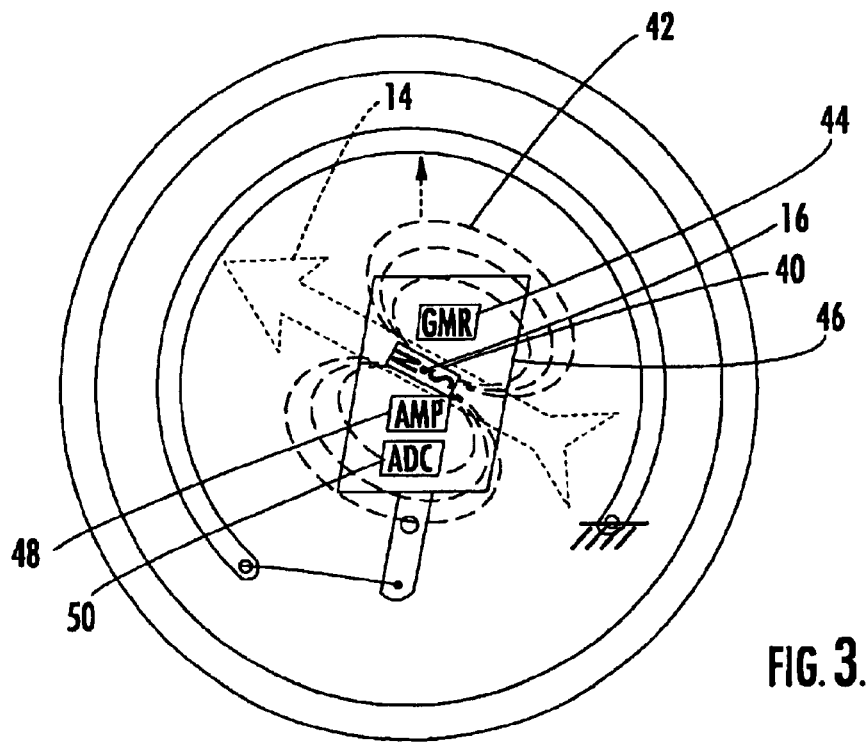
FIG. 3 is a view similar to FIG. 2 including the addition of a magnet and a magnetic field sensor according to this invention.

In accordance with this invention, a magnet such as permanent magnet 40, FIG. 3, which creates magnetic field 42 is attached to move with shaft 16 and/or indicator 14. The movement of magnet 40 and field 42 is sensed by a magneto resistive sensor such as made by Siemens Company. The best mode contemplated uses an improved magneto resistive sensor referred to as a giant magneto resistive sensor or GMR sensor, also made by Siemens.

These GMR sensors are based on the magneto resistive effects of metallic multi layers. The resistance effect is improved compared to the conventional permalloy magneto resistive devices. This technology was developed for position sensing of magnetized targets. Well known disadvantages of all kinds of magnetic sensors like Hall elements and conventional magneto resistive sensors have been the limitation in air gaps and high dependency of the output signal on mechanical alignment tolerances. One particular giant magneto resistive sensor which seems to work well is the Siemens GMR B6 which is an angle sensor based on sputtered metallic multilayer technology in which four resistors are monolithically integrated on one chip. They can be used as a full bridge or if two external resistors are added as two half bridges. One feature of this GMR sensor 44 is that it is sensitive to the orientation of the magnetic field and not to its intensity as long as the field is in the range of between 5–15 kA/m. This means that the signal output of the sensor is independent of the sensor position relative to the magnet in lateral axial rotational direction in the range of several millimeters. Permanent magnets or magnetic pole wheels may be used without the need for a biasing magnet.

Figure 4:
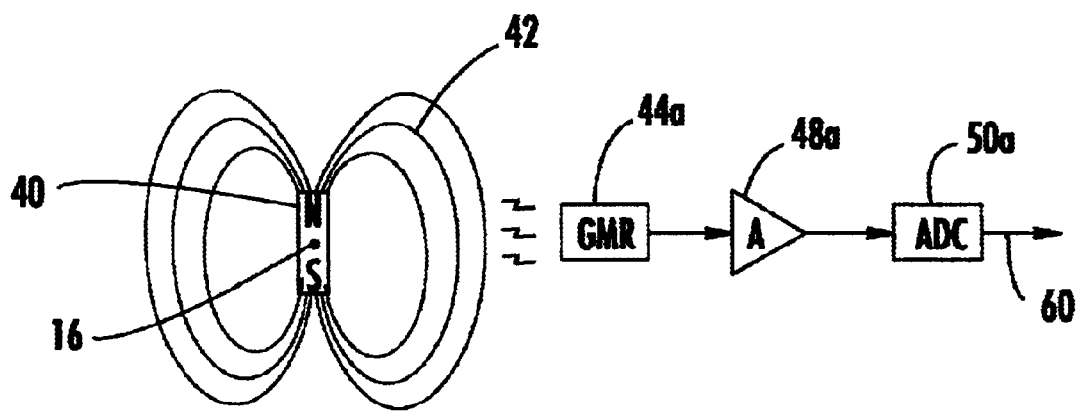
FIG. 4 is a schematic block diagram showing the electronic portion of one embodiment of the invention.

GMR sensor 44 may be mounted on a circuit board 46 on the back of the meter and it may also include an amplifier 48, and/or an A to D converter 50. Note that while magnet 40 is shown aligned with the indicator 14, this is not a necessary limitation of the invention as it can be in any orientation so long as the change in the orientation of the field is detected by GMR sensor 44. In one example, the GMR sensor may be located centered on or directly over the moving member such as shaft 16. While the GMR sensor 44 and the circuit board 46 with its other elements are shown mounted on the back of the meter, this is not a necessary limitation of the invention as the GMR sensor can be positioned anywhere sufficiently proximate to the magnetic field and the other elements conveniently located with respect to it. In one construction, FIG. 4, a Siemens' B6 GMR 44a senses magnetic field 42 produced by magnet 40. The electrical signal generated by GMR sensor 44a may then be amplified in amplifier 48a and further signal processed. In addition the signal may be converted to digital form by analog to digital converter 50a for use in a microprocessor or other digital circuitry. Thus, the output 60 includes a signal indicative of pressure which can be used as an input to machine-based data collection and processing systems.

This example utilizes a single GMR sensor to sense rotational position. This invention further includes use of multiples of this sensor to achieve a similar rotational position sensing. Multiple GMR sensors may be used in various combinations to reduce the effects of angular hysteresis, to resolve rotational angles exceeding 180 degrees or to achieve other desired resolution effects. These desirable effects can be further enhanced through the use of two or multiple GMR sensors, particularly when at least one sensor is mounted off the rotational axis of the magnet.

Thus, in any embodiment, the electromechanical rotation sensing device of this invention converts rotational motion representative of some sensed quantity into an electrical signal. This improved electromechanical rotation sensing device presents a visual indication as well as an electrical signal representative of a sensed quantity. Still, the improved electromechanical rotation sensing device is simple, inexpensive and easily incorporated into conventional rotational dial meters since magnet 40, FIG. 3 is movable with the visual indicator and magnetic field sensor 44 is responsive to the orientation of the resulting magnetic field. The result is a distinct improvement over prior art buordon tube type pressure gauges which provided a visual indication of the sensed pressure but no electrical signal representative of the sensed pressure. In addition, the sensing device of this invention is an improvement over strain gauge type sensors which are more expensive and provide no visual indication of the sensed pressure.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

What is claimed is:

1. An electromechanical rotation sensing device comprising:
    a mechanical sensing system for sensing pressure;
    a rotational member rotated by said mechanical sensing system in response to the pressure sensed;
    a magnetic device movable with said rotational member for providing a magnetic field whose orientation changes with motion of the rotational member, said magnetic device providing a magnetic field within a predetermined range; and
    a magnetic field sensor for providing an electrical signal responsive to the rotational orientation of said magnetic field and representative of the pressure sensed, said magnetic field sensor including a giant magneto resistive sensor that is sensitive to the orientation of the magnetic field independent of the intensity of the magnetic field within said predetermined range.

2. The electromechanical rotation sensing device of claim 1 in which said rotational member includes a shaft.

3. The electromechanical rotation sensing device of claim 2 in which said rotational member includes a dial indicator attached to said shaft and there is further included a graduated dial face associated with said dial indicator.

4. The electromechanical rotation sensing device of claim 1 in which said magnetic device includes a magnet.

5. The electromechanical rotation sensing device of claim 4 in which said magnetic device includes a permanent magnet.

6. The electromechanical rotation sensing device of claim 1 in which said magnetic field sensor includes a magneto resistive sensor.

7. The electromechanical rotation sensing device of claim 1 in which said mechanical sensing system includes a bourdon tube.

8. The electromechanical rotation sensing device of claim 1 in which said predetermined range is 5–15 kA/m.

9. The electromechanical rotation sensing device of claim 1 in which said magnetic field sensor includes an amplifier.

10. The electromechanical rotation sensing device of claim 1 in which said magnetic field sensor includes an analog to digital converter.

11. An electromechanical rotation sensing device comprising:
    a mechanical sensing system including a bourdon tube for sensing pressure;
    a shaft rotated by said mechanical sensing system in response to the pressure sensed and a dial indicator attached to said shaft and a graduated dial face associated with said dial indicator;
    a magnet movable with said shaft for providing a magnetic field whose orientation changes with motion of the rotational member, said magnet providing a magnetic field within a predetermined range; and
    a magnetic field sensor for providing an electrical signal responsive to the rotational orientation of said magnetic field and representative of the pressure sensed, said magnetic field sensor including a giant magneto resistive sensor that is sensitive to the orientation of the magnetic field independent of the intensity of the magnetic field within said predetermined range.

12. An electromechanical rotation sensing device comprising:

a mechanical sensing system for sensing pressure;

a rotational member rotated by said mechanical sensing system in response to the parameter sensed;

a magnetic device movable with said rotational member for providing a magnetic field within a predetermined range whose orientation changes with motion of the rotational member; and a magneto resistive sensor for providing an electrical signal responsive to the orientation of said magnetic field independent of the intensity of the magnetic field within said predetermined range.

13. An electromechanical rotation sensing device comprising:

a bourdon tube connected to a dial indicator;

a magnetic device configured to move with the dial indicator to provide a magnetic field whose orientation changes with movement of said dial indicator, said magnetic device providing a magnetic field within a predetermined range; and a sensor which senses the orientation of said magnetic field and is configured to output an electrical signal in response, said sensor including a giant magneto resistive sensor that is sensitive to the orientation of the magnetic field independent of the intensity of the magnetic field within said predetermined range.

* * * * *